(12) United States Patent
Punkka et al.

(10) Patent No.: US 6,549,850 B2
(45) Date of Patent: Apr. 15, 2003

(54) RECEIVER OF A SATELLITE POSITIONING SYSTEM AND ASSOCIATED METHOD

(75) Inventors: Eero Punkka, Helsinki (FI); Vesa Karttunen, Vantaa (FI); Erik Lindman, Espoo (FI)

(73) Assignee: Suunto Oy, Vantaa (FI)

( * ) Notice: Subject to any disclaimer, the term of this patent is extended or adjusted under 35 U.S.C. 154(b) by 0 days.

(21) Appl. No.: 09/897,634

(22) Filed: Jul. 2, 2001

(65) Prior Publication Data

US 2003/0004639 A1 Jan. 2, 2003

(51) Int. Cl.⁷ .............................. G01C 21/00; G01S 5/02
(52) U.S. Cl. .................................... 701/213; 342/357.15
(58) Field of Search ................................ 701/213, 214, 701/226; 342/357.12, 357.15

(56) References Cited

U.S. PATENT DOCUMENTS

| | | | | |
|---|---|---|---|---|
| 5,842,146 A | * | 11/1998 | Shishido | ................ 340/988 |
| 5,917,444 A | * | 6/1999 | Loomis et al. | ......... 342/357.12 |
| 6,067,045 A | * | 5/2000 | Castelloe et al. | ...... 342/357.01 |
| 6,194,824 B1 | * | 2/2001 | Ueda | ............................ 313/413 |
| 6,392,593 B1 | * | 5/2002 | Pemble | .................. 342/357.15 |

* cited by examiner

Primary Examiner—Michael J. Zanelli
(74) Attorney, Agent, or Firm—Steinberg & Raskin, P.C.

(57) ABSTRACT

A receiver of a satellite positioning system, the receiver being capable of receiving signals from satellites, determining an estimated latitude and determining an estimated longitude. The receiver being responsive to the estimated latitude, estimated longitude and information indicating orbits of the satellites for identifying a group of available satellites, for performing a search for signals transmitted by satellites which belong to the group of satellites, and for calculating the positional coordinates of the receiver based on signals received from satellites which belong to the group of satellites.

19 Claims, 2 Drawing Sheets

RECEIVER OF A SATELLITE POSITIONING SYSTEM AND ASSOCIATED METHOD

BACKGROUND OF THE INVENTION

1. Field of the Invention

This invention relates to positioning systems. More particularly, this invention relates to a solution for obtaining a first location of a receiver in a satellite positioning system, for instance when the receiver is switched on.

2. Description of the Prior Art

The GPS-system (Global Positioning system) is an example of a prior art positioning system, where the position of a receiver is calculated based on signals transmitted from satellites to the receiver. In the following the invention will, by way of example, be explained mainly in connection with the GPS-system. It should, however, be observed that the present invention can also be utilized in other positioning systems.

One problem with prior art positioning systems is the operations needed in order to obtain the first location of the receiver when the receiver performs a so-called warm-start. A warm-start refers to a situation where the receiver has in its memory information indicating the orbits of the satellites (though this information might be old), but the receiver does not have any precise information of its location when it starts the process of finding out its position. Such a situation may occur for instance if the receiver has been moved from one location to another while being switched off. Another alternative is that the receiver has not been able to receive signals transmitted by the satellites while it has been moved from one location to another (for instance inside an airplane). In such a situation the receiver is not aware of the satellites available at the location of the receiver when the warm-start is initiated. Instead, the receiver has to first search through all the available frequencies and PRN code phases in order to identify the available satellites before it can start the calculations needed to determine its location based on signals received from the satellites. The search for available satellites is rather slow and it also consumes energy, which is a drawback especially for portable receivers whose energy source consists of a battery. In practice it is usually necessary to search for only one satellite at a time in order to reduce the energy consumption. Thus a search for all 32 possible satellites and PRN codes within the GPS-system will require a time period of several tens of seconds.

An object of the present invention is to solve the above mentioned drawback and to provide a solution which makes it possible to minimize the operations needed in order to determine the location of a receiver when the receiver performs a warm-start.

A further object of the present invention is to provide a solution which makes it possible to minimize the energy consumption and time needed in order to determine the location of a receiver when the receiver performs a warm-start.

SUMMARY OF THE INVENTION

The objects of the invention are achieved with a method for determining positional coordinates of a receiver receiving signals from satellites in a satellite navigation system, said method comprising: carrying out measurements in order to obtain a measurement result describing properties of the magnetic field of the earth at the location of the receiver, obtaining an estimated latitude based on said measurement result, comparing the local time indicated by a clock in said receiver and the satellite time in order to identify the time zone where said receiver is located, obtaining an estimated longitude based on the identified time zone, identifying a group of available satellites based on the estimated latitude, estimated longitude and information indicating orbits of the satellites within said positioning system, performing a search for signals transmitted by satellites which belong to said group of available satellites, and determining the positional coordinates of the receiver based on signals received from satellites which belong to said group of satellites.

According to a second aspect, the objects of the present invention are achieved with a receiver of a satellite positioning system comprising: reception means for receiving signals transmitted by satellites, means for measuring the magnetic field of the earth at the location of said receiver in order to obtain a measurement result describing properties of said magnetic field and for obtaining an estimated latitude based on the measurement result, a clock for keeping track of the local time at the location of the receiver, and means for comparing the local time indicated by said clock and the satellite time in order to identify a time zone where said receiver is located and for obtaining an estimated longitude based on said identified time zone, said receiver being responsive to said estimated latitude, estimated longitude and information indicating orbits of the satellites for identifying a group of available satellites, for performing a search for signals transmitted by satellites which belong to said group of satellites, and for calculating the positional coordinates of the receiver based on signals received from satellites which belong to said group of satellites.

The present invention utilizes the magnetic field of the earth and the difference between the local time fed into the receiver by the user and the satellite time in order to determine a first estimated position of a receiver. Such an estimated position is not very accurate. However, the estimated position obtained in such a way is accurate enough in order to identify the satellites available at the location of the receiver. This can be done as the receiver in a warm-start situation has stored information about the orbits of the satellites in its memory, which means that the available satellites can be identified as soon as an estimated position has been calculated.

The present invention is very useful in order to determine the first location of a receiver, in other words in a situation where no exact position is available, as the search of available satellites can be reduced significantly. It is sufficient to establish an estimated position, to use orbit information in order to identify available satellites and to restrict the search only to the available satellites. Thus significant savings in time and energy consumption can be achieved.

BRIEF DESCRIPTION OF THE DRAWINGS

In the following, the present invention will be described in closer detail by way of example and with reference to the attached drawings, in which.

DESCRIPTION OF THE PREFERRED EMBODIMENTS

Figure 1:
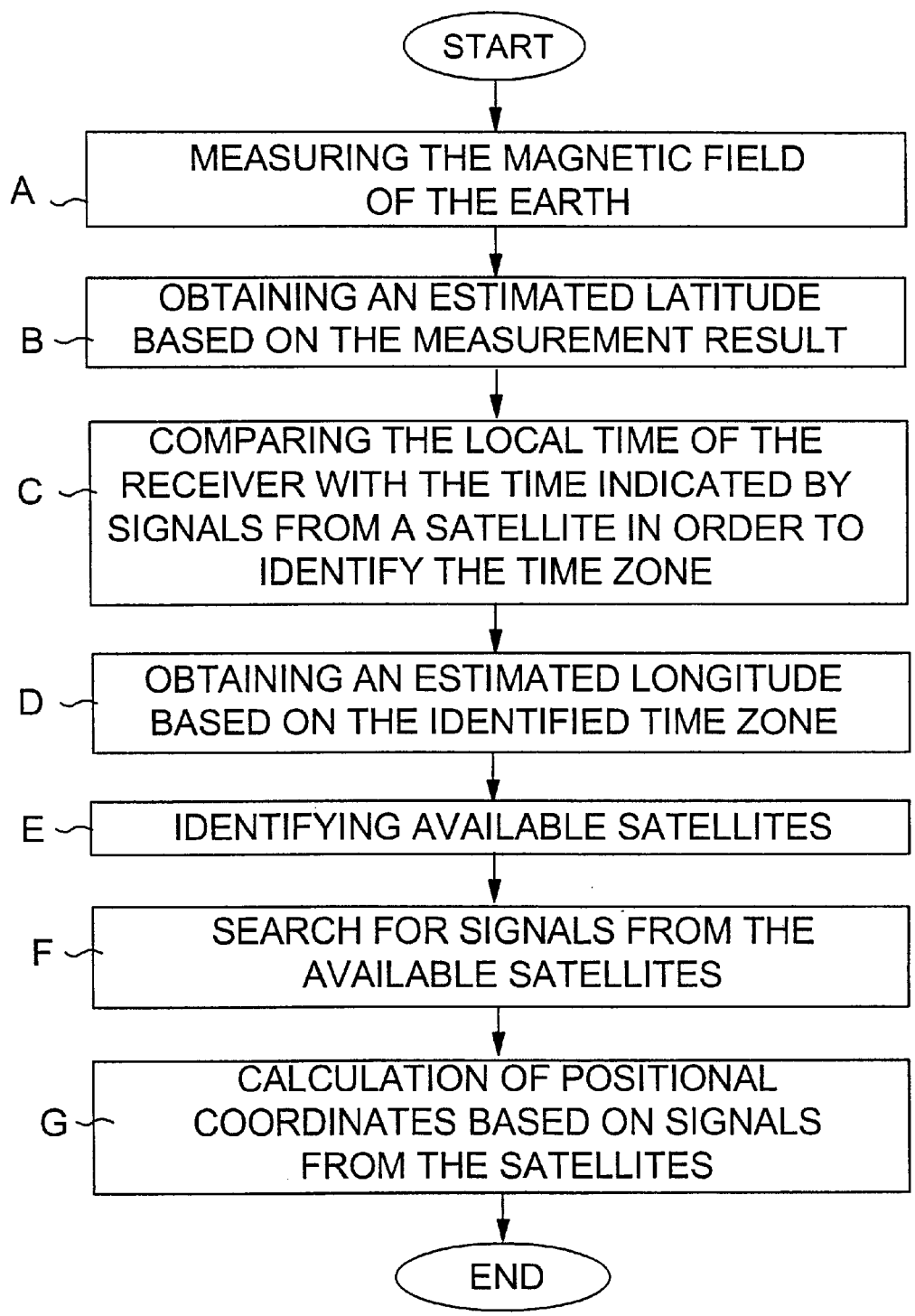
FIG. 1 is a flow diagram illustrating the method of the present invention.

FIG. 1 is a flow diagram illustrating the method of the present invention. The method of FIG. 1 can be used for instance in a GPS-receiver in order to obtain a first location when the receiver performs a warm-start. Two different embodiments of the method will be explained in connection with FIG. 1. These embodiments differ from each other in blocks A, B and F.

In block A measurements are carried out in order to obtain a measurement result describing properties of the magnetic field of the earth at the location of the receiver. This measurement result is used in block B in order to obtain an estimated latitude. There are at least two different ways of carrying out the steps of blocks A and B.

The first alternative (embodiment) is to measure the direction of the magnetic field. In this case the measurement result consists of an angle indicating the direction of the magnetic field as compared to the horizontal plane at the location of the receiver. The value of the measured angle can directly be used as the estimated latitude. The direction of the magnetic field of the earth is (as compared to the horizontal plane) for instance approximately 0° at the equator and approximately 90° at the North Pole. Alternatively the measured value can be used to retrieve the estimated latitude from a table containing different angles and corresponding estimated latitudes.

The second alternative (embodiment) is to measure the amplitude of the horizontal projection or the vertical projection of the magnetic field, in other words the strength of the magnetic field in the horizontal or vertical direction.

Theoretically the minimum strength of the horizontal projection of the magnetic field of the earth is located at the North Pole respective the South Pole while the maximum is located at the equator. When the measurement value indicating the strength of the magnetic field at the location of the receiver is available, then this value can be used for retrieving the latitude values corresponding to the measurement value for instance from a table or by using a formula. The estimated latitude will actually in this case consist of two different latitude values, one north of the equator and the other one south of the equator. The only drawback of this is that the number of satellites that the receiver has to search for later on in block F is larger.

It is, as mentioned previously, also possible to use the vertical projection of the magnetic field, in other words the strength of the magnetic field in the vertical direction, to obtain the estimated latitude. This can be done by using a single magnetic detector provided that the receiver is during the measurement kept in such a position that the detector is in a vertical position. This can be ensured for instance such that the receiver is provided with detectors measuring the direction of the gravitational force of the earth and the user is via a user interface given information indicating when the receiver is in the right position. The measurement value can then be used for instance to retrieve the estimated latitude from a table containing the values of the magnetic field in the vertical direction at different latitudes. Theoretically the maximum strength of the vertical projection of the magnetic field of the earth is located at the North Pole respective the South Pole while the minimum is located at the equator. However, to use a table where local variations have been taken into account might in some cases give a more precise result.

To use the vertical projection of the magnetic field is advantageous as the sign (+/−) of the measurement value which depends on the direction of the vertical projection of the magnetic field directly indicates if the receiver is located on the north side of the equator or on the south side of the equator. Thus it is possible to obtain only one estimated latitude.

The strength of the magnetic field of the earth in the horizontal or vertical direction might at some locations of the earth be stronger or weaker than at other locations with the same latitude. It is according to the present invention possible to take these local variations into account for instance by creating a table from where the estimated latitude can be retrieved based on the measured values.

In block C the local time indicated by the clock of the receiver is compared to the satellite time. The satellite time is included in the signals received from the satellites. It is assumed in the present invention that the user of the receiver will manually adjust the internal clock of the receiver to show the correct local time. Thus it is possible to identify the time zone where the receiver is located by comparing this local time with the satellite time.

It is not necessary to receive the satellite time by signals from a satellite after a warm-start has been initiated, as the receiver can store information indicating the difference of the local time and the satellite time in a memory in connection with earlier positioning operations. This means that the receiver is already aware of the satellite time when a warm-start is initiated. In such a case the new time zone can be identified by simply monitoring the adjustment of the local time carried out by the user. If the receiver, for instance, has stored in its memory in connection with a previous positioning operation information indicating that the local time in the time zone is equal to the satellite time +2 hours, and the user later on in connection with a warm-start at a new location adjusts the local time by adding 2 hours to the internal clock of the receiver, then the local time in the new time zone is naturally equal to the satellite time +4 hours.

In block D an estimated longitude is obtained based on the identified time zone. This can be done for instance by retrieving the longitude value from a table including the existing time zones and corresponding longitude values.

In block E the estimated latitude and longitude are used in order to identify the available satellites. A satellite is available when it is located above the horizon as seen from the location of the receiver. A GPS receiver needs four satellites in order to determine its location with full accuracy. If more than four satellites are available, then the receiver may select those four satellites which are most advantageously located in relation to the receiver.

According to the present invention the receiver is able to identify the available satellites by using the estimated latitude and longitude and information indicating the orbits of the satellites. The information about the orbits of the satellites can be stored in a memory of the receiver (as it typically changes very slowly) or alternatively the receiver can relatively soon after having been switched on receive this information from one of the satellites. When the orbits and the location are known, then the receiver is able to identify a group of satellites which should be available at that location at that particular time.

In block F the receiver carries out a search for signals from the available satellites. It should be possible to reduce this search to four satellites as signals from only four satellites are needed in order to determine the location of the receiver. Thus a significant reduction of time and energy consumption can be achieved as compared to prior art solutions where the receiver has to search for all the satellites in the system (the GPS system includes currently 29 satellites of 32 possible). Reduction in time and energy can be achieved even if the second alternative of blocks A and B for establishing the estimated latitude (based on the strength of the horizontal projection of the magnetic field of the earth) would have been used, in which case signals from satellites available at two (or more) different locations have to be searched for in block F.

Finally, the location of the receiver is calculated in block G based on the signals received from the satellites. These calculations are carried out as in prior art solutions.

Figure 2:
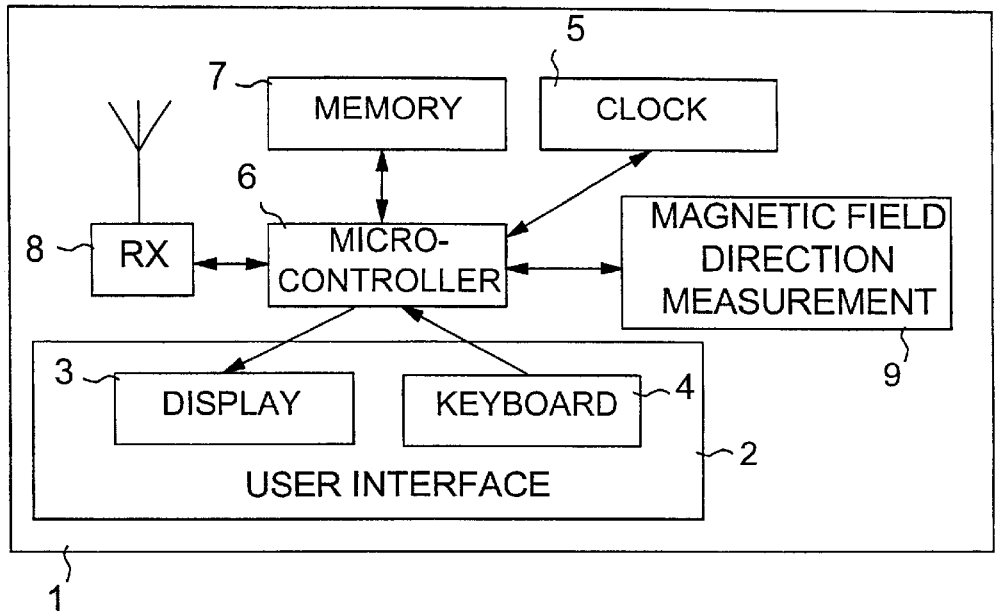
FIG. 2 is a block diagram illustrating a first preferred embodiment of a receiver.

FIG. 2 is a block diagram illustrating a first preferred embodiment of a receiver. This receiver can be used for carrying out the method as explained in connection with FIG. 1. It should be observed that the block diagram of FIG. 2 is only intended to illustrate the different functions of the receiver. These functions can for instance be carried out with one or more DSP (Digital Signal Processor) and/or one or more ASIC (Application Specific Integrated Circuit).

It is assumed by way of example that the receiver 1 of FIG. 2 is a portable GPS receiver, for instance of the wrist watch type (carried as a watch) whose energy source consists of a battery (not shown in the Figure). Thus the energy consumption is naturally of great importance. The receiver 1 of FIG. 2 includes a user interface 2 including a display 3 and pushbuttons 4. The receiver further includes a clock 5 intended to keep track of the local time in the time zone where the receiver is located. The user can change the local time by using the user interface 2.

The receiver 1 includes a microcontroller 6 controlling the functions of the receiver according to a predefined program stored in a memory 7. The microcontroller also carries out the calculations needed to determine the location of the receiver based on signals received from satellites via an antenna and reception means 8.

When the receiver of FIG. 2 performs a warm-start, the microcontroller 6 uses detectors included in the magnetic field direction measurement block 9 in order to determine the angle of the magnetic field as compared to the horizontal plane at the location of the receiver. This angle can be measured for instance with an electronic 3D compass, which can indicate the direction of the magnetic field of the earth. An electronic 3D compass is a device which makes it possible to measure the strength and direction of a magnetic field. This can be accomplished with three magnetic field detectors, x, y and z detectors, arranged at an angle of 90° in respect to each other. A suitable detector is for instance HONEYWELL HMC 1023. A 3D compass includes usually also acceleration detectors, which can be used in order to determine the direction of the gravitational force of the earth. One example of such a detector is Analog Devices ADXL202E.

The measured angle alone is sufficient in the case of a receiver of the wrist watch type, as it can be assumed that the user keeps the receiver in a substantially horizontal position (in order to see the information on the display 3) while the measurement is carried out. However, in order to avoid the need to keep the receiver in a horizontal position while measuring the previously mentioned angle, it is also possible to provide the receiver with detectors which are capable of measuring the direction of the gravitational force of the earth. The microcontroller 6 will thus receive information about the measured angle, which is directly used as the estimated latitude.

In order to obtain an estimated longitude, the microcontroller compares the local time indicated by the internal clock 5 with the satellite time. The time difference is used to identify the time zone. After that the identified time zone is used to retrieve information from the memory 7 about the longitudes of the different time zones. The longitude retrieved from memory 7 is used as the estimated longitude.

The satellites of the GPS system sequentially transmit information indicating the orbits of the satellites at different times. This information changes very slowly, so the receiver 1 can store this information in its memory 7 in order to be used in connection with a warm-start. Alternatively, this orbit information can be received from a satellite relatively shortly after a warm-start has been initiated. The estimated latitude, estimated longitude, the time and the orbit information are used by the microcontroller 6 in order to identify a group of satellites available. When the available satellites have been identified the microcontroller 6 controls the receiving means 8 to start to search for signals from these satellites. These signals are then used by the microcontroller in the calculations carried out in order to determine the location of the receiver as in prior art solutions.

Figure 3:
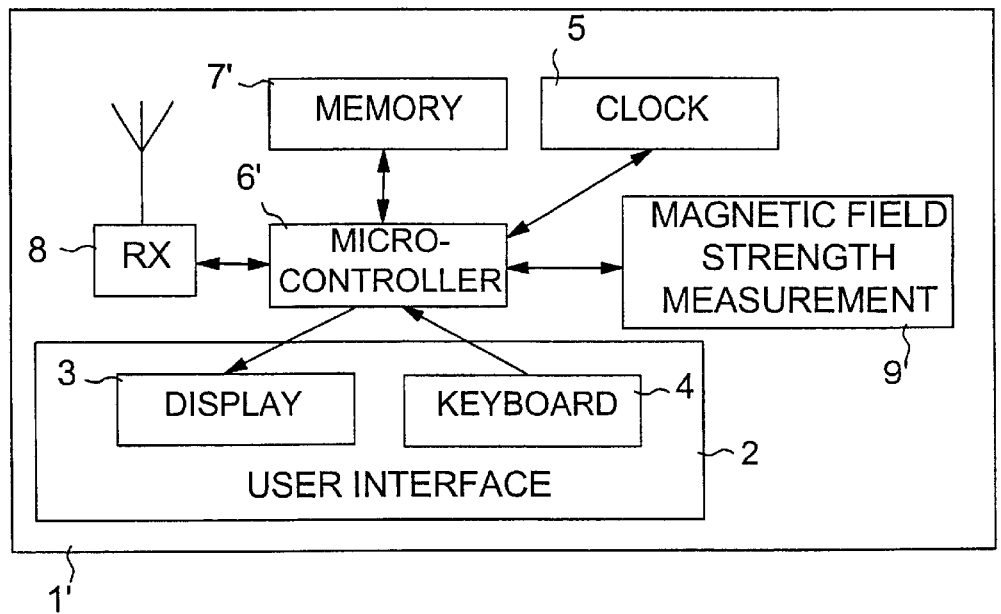
FIG. 3 is a block diagram illustrating a second preferred embodiment of a receiver.

FIG. 3 is a block diagram illustrating a second preferred embodiment of a receiver. The receiver of FIG. 3 corresponds to the receiver of FIG. 2 with the exception that block 9' of receiver 1' includes means for measuring the strength of the magnetic field on the earth instead of the direction as in FIG. 2.

The strength of the magnetic field in the horizontal direction or vertical direction can be measured for instance with an electronic 2D compass. Block 9 might also include a detector for measuring the direction of the gravitational force of the earth. Thus the need to keep the receiver in a horizontal position while measuring the strength of the magnetic field can be avoided (as explained in connection with FIG. 2).

The microcontroller 6' receives information about the measured field strength from block 9. This information is used to retrieve an estimated longitude from memory 7. In order to make this possible, a table including longitudes and corresponding values of the strength of the magnetic field of the earth has been stored in the memory 7' in advance.

The estimated latitude and the position of the receiver 1' is obtained as described in connection with the receiver of FIG. 2.

It is to be understood that the above description and the accompanying Figures are only intended to illustrate the present invention. It will be obvious to those skilled in the art that the invention can be varied and modified also in other ways without departing from the scope and spirit of the invention disclosed in the attached claims.

What is claimed is:

1. A method for determining positional coordinates of a receiver receiving signals from satellites in a satellite navigation system, said method comprising:

carrying out measurements in order to obtain a measurement result describing properties of a magnetic field at a location of the receiver, obtaining an estimated latitude based on said measurement result, comparing a local time indicated by a clock in said receiver and a satellite time in order to identify a time zone where said receiver is located, obtaining an estimated longitude based on the identified time zone, identifying a group of available satellites based on the estimated latitude, the estimated longitude and information indicating orbits of the satellites within said system, performing a search for signals transmitted by satellites which belong to said group of available satellites, and determining the positional coordinates of the receiver based on signals received from the satellites which belong to said group of available satellites.

2. The method of claim 1, wherein
the step of carrying out measurements is carried out by measuring an angle between a direction of said magnetic field and a horizontal plane at the location of the receiver, and
the step of obtaining an estimated latitude is carried out by selecting said measured angle as the estimated latitude of the receiver.

3. The method of claim 1, wherein
the step of carrying out measurements is carried out by measuring an angle between a direction of said magnetic field and a horizontal plane at the location of the receiver, and
the step of obtaining an estimated latitude is carried out by using said measured angle to retrieve the estimated latitude from a table containing different angles and corresponding latitude values.

4. The method of claim 1, wherein
the step of carrying out measurements is carried out by measuring a field strength of said magnetic field in a horizontal direction in order to obtain said measurement result, and
the step of obtaining the estimated latitude is carried out by comparing the obtained measurement result to predetermined field strength values with corresponding latitude values in order to obtain a preliminary latitude of said receiver.

5. The method of claim 1, wherein
the step of carrying out measurements is carried out by measuring a field strength of said magnetic field in a vertical direction in order to obtain said measurement result, and
the step of obtaining the estimated latitude is carried out by comparing the measurement result to predetermined field strength values with corresponding latitude values in order to obtain a preliminary latitude of said receiver.

6. A receiver of a satellite positioning system comprising:
reception means for receiving signals transmitted by satellites,
means for measuring a magnetic field at a location of said receiver in order to obtain a measurement result describing properties of said magnetic field and for obtaining an estimated latitude based on the measurement result,
a clock for keeping track of a local time at the location of the receiver, and
means for comparing the local time indicated by said clock and a satellite time in order to identify a time zone where said receiver is located and for obtaining an estimated longitude based on said identified time zone,
said receiver identifying a group of available satellites from the estimated latitude, the estimated longitude, and information indicating orbits of the satellites, performing a search for signals transmitted by satellites which belong to said group of satellites, and calculating the positional coordinates of the receiver based on signals received from satellites which belong to said group of satellites.

7. The receiver of claim 6, wherein said means for measuring the magnetic field includes means for measuring an angle between the direction of said magnetic field and a horizontal plane at the location of the receiver, whereby the measured angle is selected as the estimated latitude.

8. The receiver of claim 6, wherein said means for measuring the magnetic field includes means for measuring a field strength of said magnetic field in a horizontal direction in order to obtain said measurement result, and wherein said receiver is adapted to compare the measurement result to predetermined field strength values with corresponding latitude values in order to identify a predetermined field strength value which substantially equals the measurement result, and where the latitude value corresponding to the identified field strength value is selected as a preliminary latitude value.

9. The receiver of claim 6, wherein said means for measuring the magnetic field of the earth includes means for measuring a field strength of said magnetic field in a vertical direction in order to obtain said measurement result, and wherein said receiver is adapted to compare the measurement result to predetermined field strength values with corresponding latitude values in order to identify a predetermined field strength value which substantially equals the measurement result, and where the latitude value corresponding to the identified field strength value is selected as a preliminary latitude value.

10. The receiver of claim 6, wherein said receiver further comprises means for measuring the direction of a gravitational force of the earth at the location of the receiver and for using said measured direction in order to determine a direction of a horizontal plane.

11. The receiver of claim 6 wherein said receiver is a portable receiver having an energy source including a battery.

12. The receiver of claim 6 wherein said receiver is a wearable receiver having an energy source including a battery.

13. A receiver for determining a location, said receiver forming at least part of a satellite positioning system, said satellite positioning system having a plurality of groups of satellites, each satellite transmitting signals including a satellite time, said receiver comprising:
a reception device adapted to receive signals transmitted by said satellites,
a clock adapted to track a local time at said location of the receiver,
an electronic compass providing a measured value of a magnetic field of the earth, and
a microcontroller,
a memory having a program stored therein, said program having steps including:
estimating a latitude based on said measured value,
estimating a longitude by comparing the local time with said satellite time obtained from the signals received by the reception device,
selecting a group of available satellites based on the estimated latitude and the estimated longitude, and
searching for signals from the group of available satellites.

14. The receiver of claim 13 wherein the steps further include the step of calculating positional coordinates of the receiver based on signals received from the group of available satellites, said receiver further including a display adapted to display said positional coordinates.

15. The receiver of claim 13 further comprising a user interface for setting the clock to the local time.

16. The receiver of claim 13 wherein the electronic compass is adapted to measure an angle of the magnetic field and wherein the step of estimating the latitude includes converting said angle into an estimated longitude.

17. The receiver of claim 13 wherein the electronic compass measures a strength of the magnetic field and wherein the step of estimating the latitude includes converting the measured strength of the magnetic field into an estimated longitude.

18. The receiver of claim 13 further comprising a detector for measuring a direction of a gravitational force.

19. The receiver of claim 13 wherein the receiver is a portable receiver.

* * * * *